(12) United States Patent
Zhang et al.

(10) Patent No.: US 11,431,643 B2
(45) Date of Patent: Aug. 30, 2022

(54) METHOD, DEVICE, AND TERMINAL FOR CONTROLLING JITTER IN NETWORK COMMUNICATION

(71) Applicant: Beijing Dajia Internet Information Technology Co., Ltd., Haidian District (CN)

(72) Inventors: Chen Zhang, Haidian District (CN); Liang Guo, Haidian District (CN); Wenhao Xing, Haidian District (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/137,173

(22) Filed: Dec. 29, 2020

(65) Prior Publication Data

US 2021/0119928 A1   Apr. 22, 2021

Related U.S. Application Data

(63) Continuation of application No. PCT/CN2020/075909, filed on Feb. 19, 2020.

(30) Foreign Application Priority Data

Apr. 11, 2019 (CN) .......................... 201910290990.X

(51) Int. Cl.
*H04W 4/00* (2018.01)
*H04L 47/283* (2022.01)
(Continued)

(52) U.S. Cl.
CPC .......... *H04L 47/283* (2013.01); *H04L 43/087* (2013.01); *H04L 49/9005* (2013.01)

(58) Field of Classification Search
CPC .. H04L 47/283; H04L 43/087; H04L 49/9005
See application file for complete search history.

(56) References Cited

U.S. PATENT DOCUMENTS 10,826,838 B2 * 11/2020 Srinivasan ....... H04N 21/44004
2007/0002990 A1 * 1/2007 Lee ...................... H04L 7/0337
375/355
(Continued)

FOREIGN PATENT DOCUMENTS

| CN | 1691634 | 11/2005 |
| CN | 1713613 | 12/2005 |

(Continued)

OTHER PUBLICATIONS

International Searching Bureau, "Search Report," issued in connection with International Patent Application No. PCT/CN2020/075909, dated Apr. 2, 2020, 4 pages.
(Continued)

*Primary Examiner* — Abdelnabi O Musa
(74) *Attorney, Agent, or Firm* — Hanley, Flight & Zimmerman, LLC

(57) ABSTRACT

Embodiments of the application can provide a method, a device, and a terminal for controlling a jitter in network communication, belonging to the technical field of communication. The method includes: generating trigger information, where the trigger information is for triggering switching of a jitter control strategy for the network communication, the jitter control strategy includes a first control strategy based on a first cached data amount and a second control strategy based on a second cached data amount, and the first cached data amount is smaller than the second cached data amount; switching the jitter control strategy to a target control strategy in response to the trigger information; and controlling the jitter in the network communication by using the target control strategy, where the (Continued)

target control strategy is the first control strategy or the second control strategy corresponding to the trigger information.

11 Claims, 5 Drawing Sheets

(51) Int. Cl.
*H04L 43/087* (2022.01)
*H04L 49/9005* (2022.01)

(56) References Cited

U.S. PATENT DOCUMENTS

| | | | | |
|---|---|---|---|---|
| 2016/0171990 A1* | 6/2016 | Reuschl | ............... | G10L 19/022 704/503 |
| 2016/0180857 A1* | 6/2016 | Reuschl | ............... | G10L 19/022 704/503 |
| 2017/0063704 A1* | 3/2017 | Krinsky | ............... | H04B 17/309 |
| 2018/0190302 A1* | 7/2018 | Reuschl | ............... | H04J 3/0632 |
| 2021/0029009 A1* | 1/2021 | Li | ............... | H04L 65/403 |
| 2021/0250644 A1* | 8/2021 | Zhou | ............... | H04N 21/4331 |

FOREIGN PATENT DOCUMENTS

| | | |
|---|---|---|
| CN | 101511105 | 8/2009 |
| CN | 102648606 | 8/2012 |
| CN | 103533451 | 1/2014 |
| CN | 104168218 | 11/2014 |
| CN | 105991477 | 10/2016 |
| CN | 110113270 | 8/2019 |
| WO | 2009113926 | 9/2009 |
| WO | 2020207120 | 10/2020 |

OTHER PUBLICATIONS

China National Intellectual Property Administration, "Office Action," issued in connection with Chinese Patent Application No. 201910290990.X, dated May 6, 2020, 11 pages.
China National Intellectual Property Administration, "Office Action," issued in connection with Chinese Patent Application No. 201910290990.X, dated Nov. 23, 2020, 8 pages.

* cited by examiner

METHOD, DEVICE, AND TERMINAL FOR CONTROLLING JITTER IN NETWORK COMMUNICATION

The application is a continuation of International Application No. PCT/CN2020/075909, filed on Feb. 19, 2020, which is based on and claims priority under 35 U.S.C 119 to Chinese patent application filed to the China National Intellectual Property Administration on Apr. 11, 2019, with the application number 201910290990.X, entitled "METHOD. DEVICE. TERMINAL AND STORAGE MEDIUM FOR CONTROLLING JITTER IN NETWORK COMMUNICATION", the entire contents of which are incorporated into the application by reference.

FIELD

The application belongs to the technical field of communication, and particularly relates to a method, a device, and a terminal for controlling a jitter in network communication.

BACKGROUND

In network communication, a shared data area is usually set up to collect data packets within fixed intervals in network communication, and voice information is processed through a voice processor, where changes in the arrival time of the data packets in the data area is referred to as jitter which is usually caused by network congestion, timing drift or routing change during network communication.

At present, a jitter controller is arranged at a receiving end in network communication to realize delay buffering, packet loss compensation, and out-of-sequence rearrangement through specific algorithms, thereby adapting to changes in network delays and providing users with clear and coherent voice data.

SUMMARY

According to an embodiment of the application, a method for controlling a jitter of network communication is provided, is applied to a terminal, and includes the following steps:

generating trigger information, where the trigger information is for triggering switching of a jitter control strategy for the network communication, the jitter control strategy includes a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount;

switching the jitter control strategy to a target control strategy in response to the trigger information, and controlling the jitter in the network communication by using the target control strategy, where the target control strategy is the first control strategy or the second control strategy which corresponds to the trigger information.

According to an embodiment of the application, a device for controlling a jitter for network communication is provided, is applied to a terminal and includes:

an information generation module, configured to generate trigger information, where the trigger information is for triggering switching of a jitter control strategy for the network communication, the jitter control strategy includes a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount; and a strategy switching module, configured to switch the jitter control strategy to a target control strategy in response to the trigger information, and control the jitter in the network communication by using the target control strategy, where the target control strategy is the first control strategy or the second control strategy which corresponds to the trigger information.

According to an embodiment of the application, a terminal is provided and includes:

a processor; and a memory configured to store executable instructions of the processor;

where the processor is configured to:

generate trigger information, where the trigger information is for triggering switching of a jitter control strategy for the network communication, the jitter control strategy includes a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount, and switch the jitter control strategy to a target control strategy in response to the trigger information, and control the jitter in the network communication by using the target control strategy, where the target control strategy is the first control strategy or the second control strategy which corresponds to the trigger information.

According to an embodiment of the application, a non-transitory computer-readable storage medium is provided. When instructions in the storage medium are performed by a processor of an electronic device, the electronic device can perform the above method for controlling the jitter in the network communication.

According to an embodiment of the application, a computer program product is provided. When the computer program product is performed by a processor of an electronic device, the electronic device can perform the above method for controlling the jitter in the network communication.

The above description is only the summary of the technical solutions of the embodiments of the application, in order to more clearly understand the technical means of the embodiments of the application, the technical means can be implemented according to the content of the specification, and furthermore, in order to make the above description and other objectives, features and advantages of the embodiments of the application more easily understandable, the specific implementation manners of the embodiments of the application are specifically listed for illustration.

BRIEF DESCRIPTION OF THE DRAWINGS

Those of ordinary skill in the art can make clear various other advantages and benefits by reading the detailed description of the preferred embodiments hereunder. Accompanying drawings are only for the purpose of illustrating the preferred embodiments, and are not considered as a limitation to the embodiments of the application. In the entire accompanying drawings, same reference symbols are used to indicate same parts. In the accompanying drawings.

DETAILED DESCRIPTION OF THE EMBODIMENTS

The embodiments of the application will be described in more detail below with reference to the accompanying drawings. Although the embodiments of the application are shown in the accompanying drawings, it should be understood that the application can be implemented in various forms and cannot be limited by the embodiments illustrated herein. On the contrary, these embodiments are provided to more thoroughly understand the application and to completely convey the scope of the application to those skilled in the art.

Figure 1:
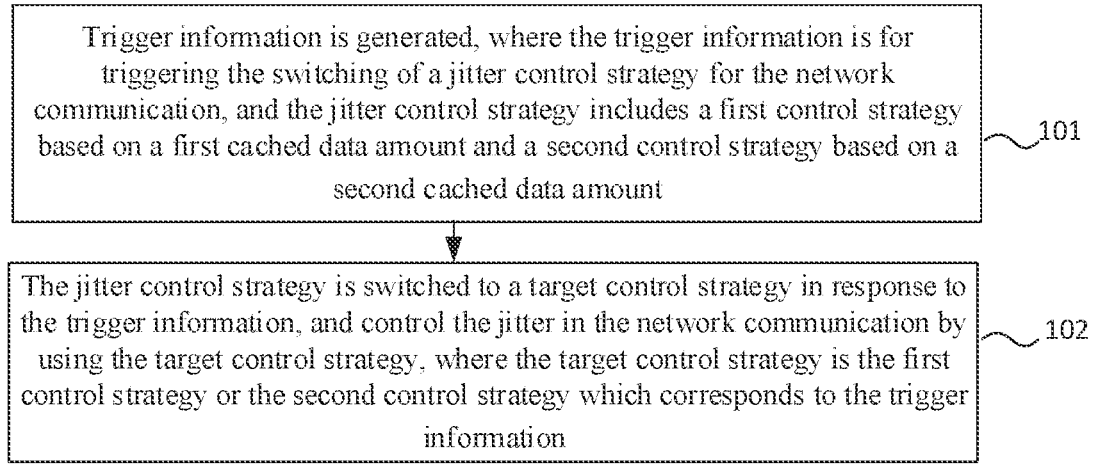
FIG. 1 illustrates a flow chart of steps of a method for controlling a jitter in network communication according to an embodiment of the disclosure.

FIG. 1 illustrates a flow chart of steps of a method for controlling a jitter in network communication according to an embodiment of the disclosure, and as shown in FIG. 1, the method is applied to a terminal and includes the following steps.

Step 101, trigger information is generated.

The trigger information is for triggering the switching of a jitter control strategy for the network communication, the jitter control strategy includes a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount.

Figure 2:
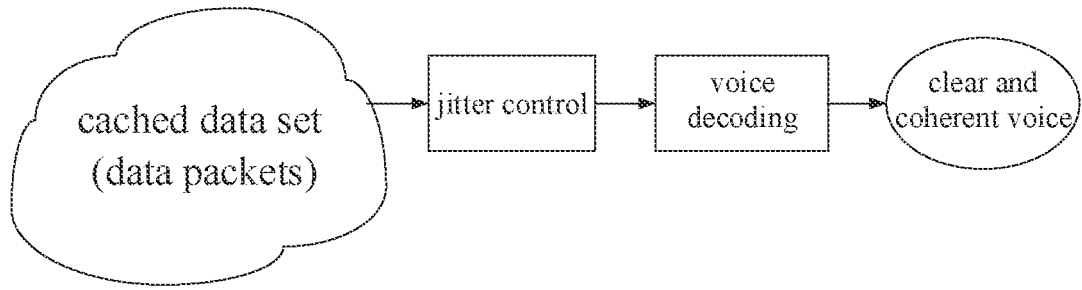
FIG. 2 illustrates a flow chart of jitter control according to an embodiment of the disclosure.

In some embodiments, in order to ensure communication quality in a network communication process, a jitter controller is arranged on a terminal, i.e., a receiving end for data packets in the network communication, so that data packets with delay jitter, packet loss, and disorder in the communication process are optimized, then voice decoding is performed, and finally coherent and clear voice data is output to an user of a terminal, as shown in a flow chart of FIG. 2.

Furthermore, in some embodiments, different communication demands are required in different application scenarios. For example, in a voice communication scenario, communication continuity and timeliness are the main requirements, and, lower delay and capabilities of jitter resistance, packet loss resistance and out-of-sequence resistance are required. The first control strategy is set for the voice communication scenario so as to ensure low-delay voice communication, because the first control strategy is performed based on a lower cached data amount, i.e., the first cached data amount. Specifically, based on the first cached data amount, the first control strategy abandons data packets with higher delay in a cached data set (a first part in FIG. 2), i.e., data packets which spend longer time to reach the cached data set, e.g., 5% of data packets in the cached data set, so that the realization of lower delay is ensured. In some embodiments, in a musical singing scenario, communication quality and sound quality are the main requirements, stronger capabilities of jitter resistance, packet loss resistance and out-of-sequence resistance are required, but the requirement on delay is low, that is to say, higher delay can also meet the demands in this scenario. So, the second control strategy can be set in the musical singing scenario, that is, jitter control is performed by using the second cached data amount higher than the first cached data amount. Specifically, based on the second cached data amount, the second control strategy can include all data packets generated in the network communication process to reduce the probability of packet loss; and meanwhile, sufficient time is for packet loss compensation and out-of-sequence rearrangement of the data packets, that is, the network communication quality is ensured in the case of loss of part of response time. Therefore, in some embodiments, the jitter control strategy adaptive to different application scenarios can be set in the jitter controller to ensure communication quality in the different application scenarios.

Since jitter control in the communication process is performed by using the jitter control strategy based on the data packets in the cached data set, different control strategies correspond to different target cached data amounts. In some embodiments, as shown in FIG. 3, a first dotted line shows the first cached data amount in the voice communication scenario, a second dotted line indicates that a longer time is spent compared with the time indicated by the first dotted line, which means a larger data amount, and the second dotted line shows the second cached data amount in the musical singing scenario.

Figure 3:
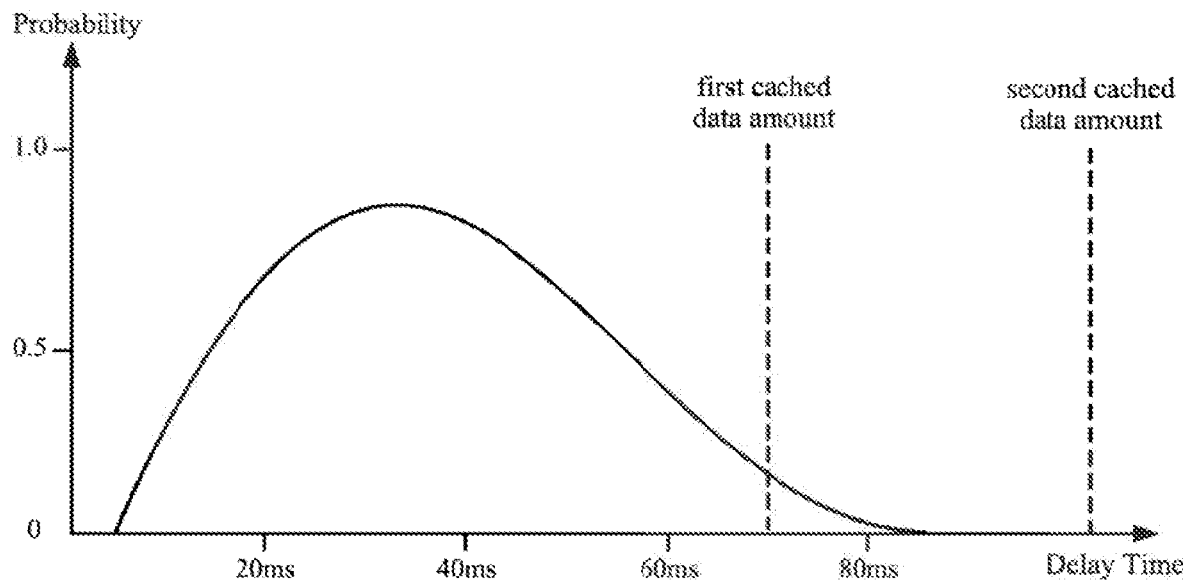
FIG. 3 illustrates a schematic diagram of a cached data amount according to an embodiment of the disclosure.

It should be noted that in FIG. 3, a horizontal axis indicates delay time of each data packet in the cached data set, a vertical axis indicates a probability that each data packet appears in the corresponding delay time in the horizontal axis, i.e., a probability of a certain delay of the data packet. Where a point of intersection of the first cached data amount/second cached data amount and the horizontal axis is a maximum delay of the data packet cached in the cached data set in the corresponding first control strategy/second control strategy. Since in the network communication process, a time interval included in each data packet is a fixed value, such as 5 ms, the point of intersection of the corresponding first cached data amount/second cached data amount and the horizontal axis corresponds to a certain percentage of the size of the data amount (the amount of the data packets).

Step 102, the jitter control strategy is switched to a target control strategy in response to the trigger information, and control the jitter in the network communication by using the target control strategy.

The target control strategy is the first control strategy or the second control strategy which corresponds to the trigger information.

In some embodiments, the trigger information includes: first trigger information for switching the jitter control strategy from the first control strategy to the second control strategy, or second trigger information for switching the jitter control strategy from the second control strategy to the first control strategy.

In some embodiments, the second trigger information switches the jitter control strategy from the second control strategy to the first control strategy (the target control strategy). From the musical signing scenario switched to the voice communication scenario, since the amount of the data packets in the cached data set in the musical singing scenario is much larger than the first cached data amount set by the first control strategy, a part of data packets in the cached data set can be abandoned, so as to reduce the amount of the data packets in the cached data set and ensure that the amount of the data packets in the cached data set is close to the first cached data amount corresponding to the current target control strategy. The first trigger information switches the jitter control strategy from the first control strategy to the second control strategy, and since the requirement on delay is low in the musical singing scenario, a larger amount of data packets needs to be stored in the cached data set (compared with the amount in the first control strategy), a supplementary package can be added to reach an amount close to the second cached data amount, thereby ensuring communication quality.

In some embodiments, based on the different target control strategies (the first control strategy/the second control strategy) corresponding to the trigger information, the corresponding target cached data amounts (the first cached data amount/the second cached data amount) are also different, so that when the control strategy is switched, the amount of the data packets in the cached data set needs to be controlled to make the amount close to the target cached data amount, so as to realize jitter control by using the target control strategy.

To sum up, according to the method for controlling the jitter in the network communication according to the embodiment of the application, the trigger information is generated, the trigger information is for triggering the switching of the jitter control strategy for the network communication, the jitter control strategy includes the first control strategy based on the first cached data amount and the second control strategy based on the second cached data amount, and the first cached data amount is smaller than the second cached data amount; and the jitter control strategy is switched to the target control strategy in response to the trigger information, the jitter is controlled in the network communication by using the target control strategy, and the target control strategy is the first control strategy or the second control strategy which corresponds to the trigger information. In this way, the jitter control strategy can be switched according to actual application scenarios of network communication, so as to meet the requirements of network communication in different scenarios, and improve the flexibility and communication quality of network communication.

Figure 4:
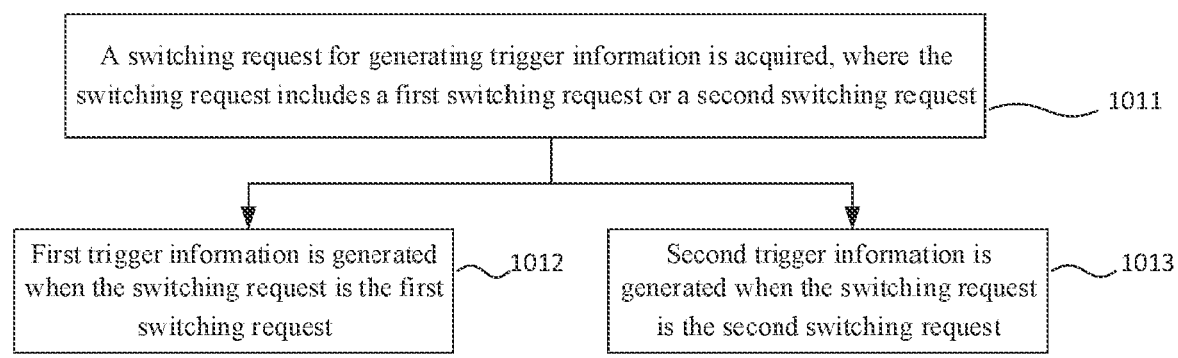
FIG. 4 illustrates a flow chart of specific steps of a method for controlling a jitter in network communication according to an embodiment of the disclosure.

FIG. 4 illustrates a flow chart of specific steps of a method for controlling a jitter in the network communication according to an embodiment of the disclosure, and as shown in FIG. 4, the step 101 that trigger information is generated includes the following steps.

Step 1011, a switching request for generating trigger information is acquired.

The switching request includes a first switching request or a second switching request.

In some embodiments, in the voice communication scenario or musical singing/reciting scenario, a user can switch the current jitter control strategy by himself. For example, a corresponding virtual button or physical button (sound volume + or sound volume −) is displayed on a musical singing/reciting application program interface to trigger the generation of a switching request. When the user clicks the virtual button to trigger the generation of the switching request, and the terminal performs the following steps after obtaining the switching request. When using an application, the user can switch the jitter control strategy according to personal preferences, so as to select a jitter control strategy that meets the preferences of the user to control the jitter.

Step 1012, first trigger information is generated when the switching request is the first switching request.

Step 1013, second trigger information is generated when the switching request is the second switching request.

In some embodiments, the step 1012 or the step 1013 is performed respectively according to the acquired switching request and the currently adopted jitter control strategy. That is to say, when the current jitter control strategy is the first control strategy, the target control strategy is the second control strategy, and the switching request is the first switching request for generating the first trigger information. On the contrary, when the current jitter control strategy is the second control strategy, the target control strategy needs to be set to the first control strategy, and the switching request is the second switching request for generating the second trigger information.

Figure 5:
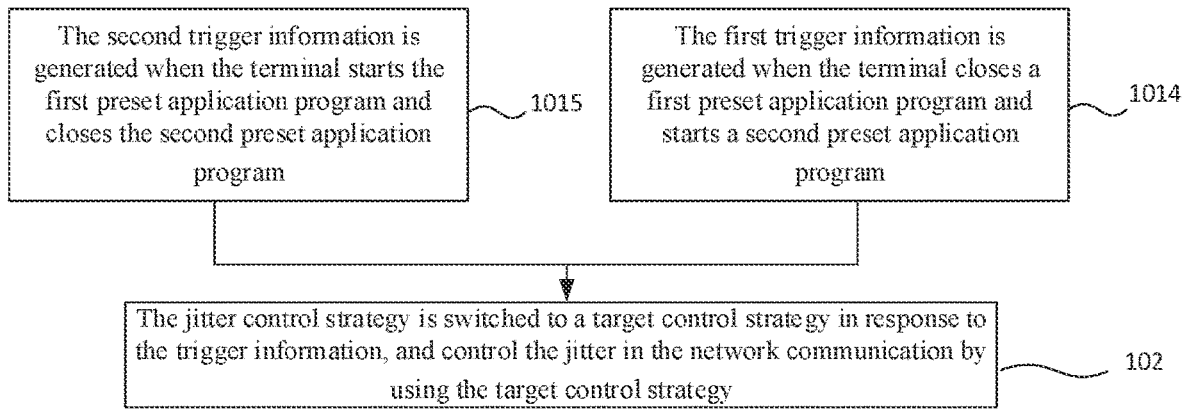
FIG. 5 illustrates a flow chart of specific steps of a method for controlling a jitter in network communication according to an embodiment of the disclosure.

FIG. 5 illustrates a flow chart of specific steps of a method for controlling a jitter in the network communication according to an embodiment of the disclosure, and as shown in FIG. 5, the step 101 that trigger information is generated includes the following steps.

Step 1014, the first trigger information is generated when the terminal closes a first preset application program and starts a second preset application program.

Step 1015, the second trigger information is generated when the terminal starts the first preset application program and closes the second preset application program.

The first preset application program is an application program for controlling the jitter by using the first control strategy on the terminal, and the second preset application program is an application program for controlling the jitter by using the second control strategy on the terminal.

In some embodiments, the trigger information for switching the jitter control strategy can be generated based on the application programs started or closed on the terminal. The first preset application program is relevant to voice communication, that is, the first control strategy is used for controlling the jitter to ensure the continuity of network communication, e.g., chatting application programs, phone call application programs, etc. Correspondingly, the second preset application program is relevant to musical singing, recitation, and live broadcast. e.g., recording application programs (Changba (an online singing application program)), poetry recitation application programs, etc., and the second control strategy is needed to ensure the quality of network communication. For example, the first trigger information is generated when the chatting application program is switched to the musical singing application program, that is, the first control strategy is switched to the second control strategy. On the contrary, when the user intends to start a voice communication function (the first preset application program) after closing the musical singing application program (the second preset application program) on the terminal, the second trigger information is generated correspondingly to control the jitter in the voice communication scenario by using the first control strategy.

It should be noted that the first preset application program can be any one of multiple application programs relevant to voice communication, the second preset application program may be any one of multiple application programs relevant to musical singing, recitation, and live broadcast, and no specific limitation is made by the embodiments of the application.

Figure 6:
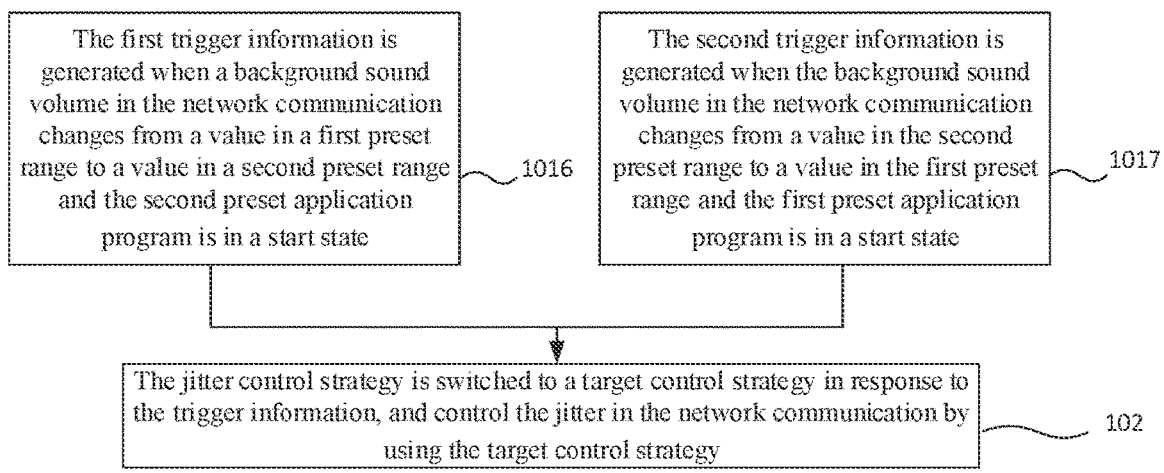
FIG. 6 illustrates a flow chart of specific steps of a method for controlling a jitter in network communication according to an embodiment of the disclosure.

In some embodiments, there is another way for generating the trigger information as shown in FIG. 6, and the step 101 includes the following steps.

Step 1016, the first trigger information is generated when a background sound volume in the network communication changes from a value in a first preset range to a value in a second preset range and the second preset application program is in a start state.

A maximum value in the first preset range is smaller than a minimum value in the second preset range.

Step 1017, the second trigger information is generated when the background sound volume in the network communication changes from a value in the second preset range to a value in the first preset range and the first preset application program is in a start state.

In some embodiments, when using the musical singing application program, the user usually sings, recites, or does other activities with music background. Therefore, when the background sound volume in the network communication is switched from the lower first preset range to a higher range (the second preset range), and the current second preset application program, i.e., the musical singing application program, is also in the start state, it means that the terminal starts the musical singing application, that is, the first trigger information can be used to switch the first control strategy to the second control strategy. On the contrary, when the background sound volume in the network communication is switched from the second preset range to the first preset range smaller than the second preset range, and the first preset application program is started, it means that the user switches the previous musical signing scenario to the voice communication scenario, that is, the second trigger information is used to switch the second control strategy to the first control strategy.

Specifically, optimized values of threshold values of the first preset range and the second preset range may be obtained after multiple measurements.

Figure 7:
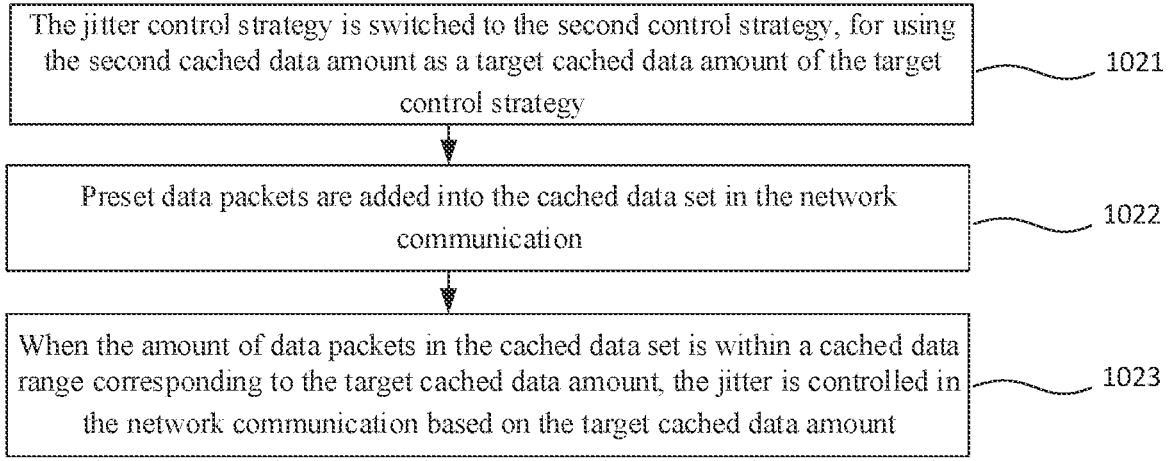
FIG. 7 illustrates a flow chart of specific steps of a method for controlling a jitter in network communication according to an embodiment of the disclosure.

FIG. 7 illustrates a flow chart of specific steps of a method for controlling a jitter in the network communication according to an embodiment of the disclosure, and as shown in FIG. 7, the step 102 that the jitter control strategy is switched to a target control strategy in response to the trigger information, and control the jitter in the network communication by using the target control strategy includes the following steps.

Step 1021, the jitter control strategy is switched to the second control strategy, for using the second cached data amount as a target cached data amount of the target control strategy.

In some embodiments, when the trigger information is the first trigger information, the target control strategy is determined to be the second control strategy, and the second control strategy is used to control the jitter in the network communication. The second cached data amount is the data amount dependent by the second control strategy, i.e., the target cached data amount used under the second control strategy.

Step 1022, preset data packets are added into the cached data set in the network communication.

Step 1023, when the amount of data packets in the cached data set is within a cached data range corresponding to the target cached data amount, the jitter is controlled in the network communication based on the target cached data amount.

In some embodiments, since the first cached data amount previously used by the first control strategy is smaller than the data amount of the target control strategy, i.e., the second cached data amount used by the second control strategy, the supplementary packets, i.e., the preset data packets, are added to the cached data set after the target cached data amount is raised to be the second cached data amount, so as to reach the target cached data amount, thereby ensuring that the amount of the data packets in the cached data set can meet the requirements of the second control strategy when the second control strategy is used to control the jitter, and further controlling the jitter according to the data packets in the cached data set to meet the quality requirement of the musical singing scenario on voice data. Since the second cached data amount has a larger amount of data packets (as shown in FIG. 3), being different from the jitter control strategy in the embodiments below, an acceleration strategy or a deceleration strategy is not adopted in the musical singing scenario to avoid packet loss and packet insertion, so as to avoid affecting the sound quality in the musical singing scenario, and only the amount of the data packets in the cached data set needs to be increased at the initial stage of switching to the second control strategy.

Furthermore, it should be noted that the cached data range is set based on the second control strategy, and the amount of the data packets in the cached data set needs to be kept in a range, for example, from the second cached data amount −5% to the second cached data amount +5%, and also may be a value conforming to the current application scenario, which is not specifically limited by the embodiments of the application.

Figure 8:
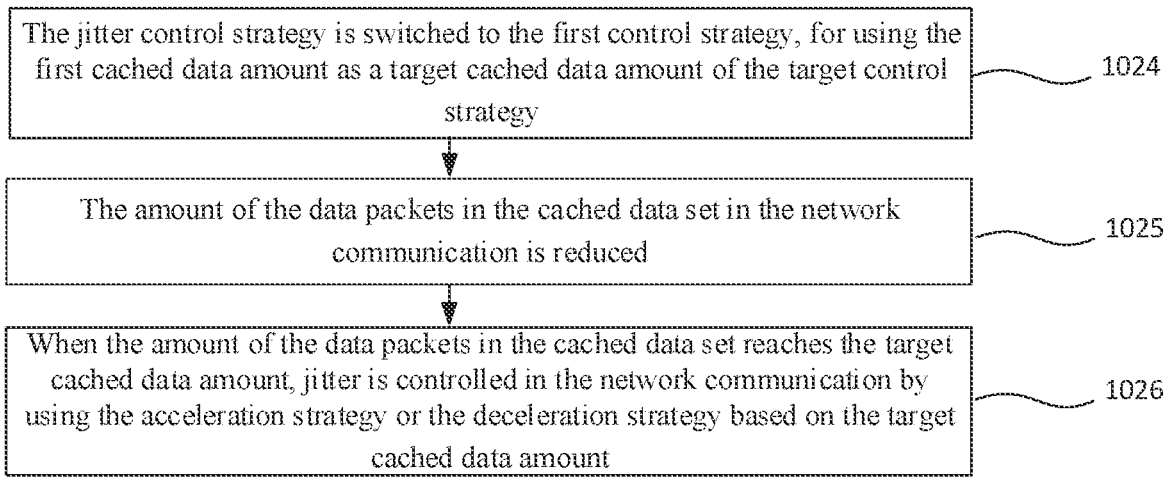
FIG. 8 illustrates a flow chart of specific steps of a method for controlling a jitter in network communication according to an embodiment of the disclosure.

In some embodiments, when the trigger information is the second trigger information, the step 102 that the jitter control strategy is switched to a target control strategy in response to the trigger information, and control the jitter in the network communication by using the target control strategy, as shown in FIG. 8, includes the following steps.

Step 1024, the jitter control strategy is switched to the first control strategy, for using the first cached data amount as a target cached data amount of the target control strategy.

In some embodiments, according to the second trigger information, the target control strategy is determined to be the first control strategy, and the corresponding target cached data amount is the first cached data amount corresponding to the first control strategy.

Step 1025, the amount of the data packets in the cached data set in the network communication is reduced.

In some embodiments, the previous second control strategy adopts a larger cached data amount, i.e., the second cached data amount, while for the target control strategy, i.e., the first control strategy, the data packets cached in the second cached data amount are excessive in amount and need to be abandoned, so as to keep the amount of the data packets in the cached data set close to the target cached data amount. That is to say, when the amount of the data packets in the cached data set is close to the first cached data amount, the acceleration strategy or deceleration strategy in the embodiments of FIG. 1 is started, so as to ensure low delay of voice communication.

Step 1026, when the amount of the data packets in the cached data set reaches the target cached data amount, jitter is controlled in the network communication by using the acceleration strategy or the deceleration strategy based on the target cached data amount.

The acceleration strategy and the deceleration strategy are configured to keep the amount of the data packets in the cached data set in the network communication within the cached data range corresponding to the target cached data amount.

In some embodiments, when the first control strategy is used for controlling the jitter, a situation that the amount of the data packets in the cached data set is much smaller than the first cached data amount may happen, that is, the deceleration strategy is started, and supplementary packets are inserted to increase the amount of the data packets in the cached data set. The supplementary packages are data packets for supplementary content generated based on historical network communication content, so as to ensure the continuity of the voice communication process. Or, when the amount of the data packets in the cached data set is far greater than the first cached data amount, the acceleration strategy is adopted to abandon some of the data packets to reduce the amount of the data packets in the cached data set. When the data packets are abandoned, a preset abandoning probability can be used to avoid the impact on the continuity of the voice communication process.

Furthermore, the cached data range is a numerical range determined based on the first data cached data amount, which is not specifically limited by the embodiments of the application.

To sum up, in the method for controlling the jitter in the network communication according to the embodiments of the application, the jitter control strategies can be flexibly switched in different network communication scenarios to ensure the corresponding jitter control strategy is used in actual scenarios. A difference exists between the target cached data amounts in different control strategies when switching is performed, normal use of the target control strategy after switching can be ensured, and the switching between the first cached data amount and the second cached data amount can be realized by using the above steps.

Figure 9:
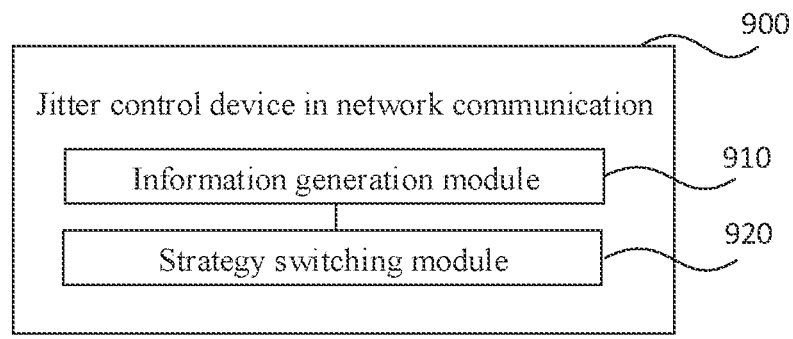
FIG. 9 illustrates a block diagram of a device for controlling a jitter in network communication according to an embodiment of the disclosure.

FIG. 9 illustrates a block diagram of a device for controlling a jitter in network communication according to an embodiment of the disclosure. Referring to FIG. 9, the jitter control device 900 is applied to a terminal and includes:

an information generation module 910, configured to generate trigger information, where the trigger information is for triggering the switching of a jitter control strategy for the network communication, the jitter control strategy includes a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount; and a strategy switching module 920, configured to switch the jitter control strategy to a target control strategy in response to the trigger information, and control the jitter in the network communication by using the target control strategy, where the target control strategy is the first control strategy or the second control strategy which corresponds to the trigger information.

In some embodiments, the trigger information includes first trigger information for switching the jitter control strategy from the first control strategy to the second control strategy or second trigger information for switching the jitter control strategy from the second control strategy to the first control strategy.

In some embodiments, the information generation module 910 includes:

a request acquisition sub-module, configured to acquire a switching request for generating the trigger information, where the switching request includes a first switching request or a second switching request:

an information generation sub-module, configured to generate the first trigger information when the switching request is the first switching request; and the information generation sub-module, further configured to generate the second trigger information when the switching request is the second switching request.

In some embodiments, the information generation module 910 is configured to:

generate the first trigger information when the terminal closes a first preset application program, and starts a second preset application program; or generate the second trigger information when the terminal starts a first preset application program and closes a second preset application program;

where the first preset application program is an application program for controlling the jitter by using the first control strategy on the terminal, and the second preset application program is an application program for controlling the jitter by using the second control strategy on the terminal.

In some embodiments, the information generation module 910 is further configured to:

generate the first trigger information when a background sound volume in the network communication changes from a value in a first preset range to a value in a second preset range and the second preset application program is in a start state; or generate the second trigger information when a background sound volume in the network communication changes from the value in a second preset range to a value in a first preset range and the first preset application program is in a start state:

where a maximum value in the first preset range is smaller than a minimum value in the second preset range.

In some embodiments, when the trigger information is the first trigger information, the strategy switching module 920 includes:

a strategy switching sub-module, configured to switch the jitter control strategy to the second control strategy, for using the second cached data amount as a target cached data amount of the target control strategy;

a data packet addition sub-module, configured to add preset data packets into a cached data set in the network communication; and a jitter control sub-module, configured to control the jitter in the network communication based on the target cached data amount when the amount of data packets in the cached data set reaches the target cached data amount.

In some embodiments, when the trigger information is the second trigger information, the strategy switching module 920 includes:

a strategy switching sub-module, configured to switch the jitter control strategy to the first control strategy for using the first cached data amount as a target cached data amount of the target control strategy:

a data packet reduction sub-module, configured to reduce the amount of the data packets in a cached data set in the network communication; and a jitter control sub-module, configured to control the jitter in the network communication by using an acceleration strategy and/or a deceleration strategy based on the target cached data amount when the amount of the data packets in the cached data set reaches the target cached data amount;

where the acceleration strategy and the deceleration strategy are configured to keep the amount of the data packets in the cached data set in the network communication within the cached data range corresponding to the target cached data amount.

Since the above embodiments of the device is basically similar to the embodiments of the method, the description about the embodiments of the device is relatively simple, and related details can refer to the partial description of the embodiments of the method.

Figure 10:
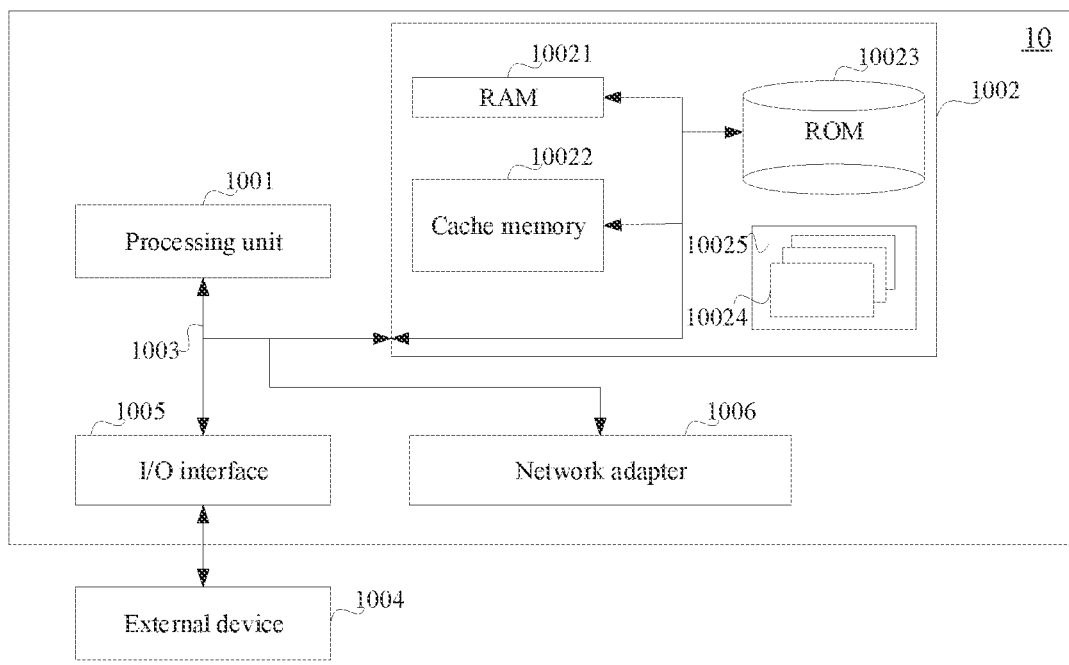
FIG. 10 illustrates a schematic structural diagram of a terminal for implementing a method for controlling a jitter in network communication according to an embodiment of the disclosure.

FIG. 10 illustrates a schematic structural diagram of a terminal 10 for realizing the above any method for control the jitter in the network communication according to an embodiment of the disclosure. The terminal 10 takes the form of a general-purpose computing device, and may include but is not limited to the following components; at least one processing unit 1001, at least one memory unit 1002, and a bus 1003 connecting different system components (including the storage unit 1002 and the processing unit 1001).

The bus 1003 represents one or more of several types of bus structures, including a memory bus or a memory controller, a peripheral bus, a processor, or a local bus using any one of multiple bus structures.

The memory unit 1002 may include a readable medium in a volatile memory form, such as a random access memory (RAM) 10021 and/or a cache memory 10022, and may further include a read-only memory (ROM) 10023.

The memory unit 1002 may also include a program/utility tool 10025 having a group of (at least one) program module 10024, and the program module 10024 includes but is not limited to: an operating system, one or more application programs, other program modules, and program data. Each of these examples or some combinations may include realization of a network environment.

The terminal 10 can be in communication with one or more external devices 1004 (such as a keyboard and a pointing device), can also be in communication with one or more devices that make a user interact with the terminal 10, and/or can be in communication with any device (such as a router and a modem) that makes the terminal 10 be in communication with one or more other computing devices. Such communication can be performed through an input/output (I/O) interface 1005. Furthermore, the terminal 10 can also be in communication with one or more networks (such as a local area network (LAN), a wide area network (WAN), and/or a public network, e.g., Internet) through a network adapter 1006. As shown in FIG. 10, the network adapter 1006 is in communication with other modules used for the terminal 10 through the bus 1003. It should be understood that although not shown in FIG. 10, other hardware and/or software modules can be used in combination with the terminal 10, including but not limited to a microcode, a device driver, a redundancy processing unit, an external disk driving array, a Redundant Arrays of Independent Disks (RAID) system, a tape driver, data backup storage system, etc.

Those skilled in the art should understand that FIG. 10 is only an example of the terminal, and does not construct a limitation on the terminal, and the terminal may include more or less components than those shown in the figure, or a combination of some components, or different components.

An embodiment of the application further provides a non-transitory computer-readable storage medium. When instructions in the storage medium are performed by a processor of an electronic device, the electronic device can perform the above any method for control the jitter in the network communication.

In some embodiments, the method for controlling the jitter in the network communication according to the embodiments of the application can also be implemented in a form of a computer program product in various aspects. When the program product operates on an electronic device, the electronic device can perform the above any method for controlling the jitter in the network communication.

The various embodiments in the specification are described in a progressive manner, each embodiment focuses on differences from other embodiments, and the same or similar parts of the embodiments can refer to each other.

It is easy for those skilled in the art to think that the application of any combination of the above embodiments is feasible, so that any combination of the above embodiments is an implementation solution of the application, but detailed description is omitted in the specification due to space limitation.

The method for controlling the jitter in the network communication provided herein is not inherently related to any specific computer, virtual system or other equipment. Various general-purpose systems can be used together with teaching based on this. According to the above description, a structure required to construct a system with the embodiment solution of the application is obvious. Furthermore, the embodiments of the application are also not directed to any specific programming language. It should be understood that the content of the embodiments of the application can be realized by using various programming languages, and the above description for the specific language is for a purpose of disclosing a best implementation manner of the embodiments of the application.

The specification provided herein illustrates a lot of specific details. However, it can be understood that the embodiments of the application can be implemented without these specific details. In some embodiments, well-known methods, structures and technologies are not described in detail, so as to avoid obscuring the understanding of the specification.

Similarly, it should be understood that in the above description of the embodiments of the application, the various features of the embodiments of the application are sometimes grouped into a single embodiment, figure, or descriptions thereof, in order to simplify the embodiments of the application and help understand the application in one or more aspects. However, the disclosed method should not be interpreted as reflecting an intention that the claimed embodiments of the application require more features than those explicitly disclosed in each claim. More definitely, as reflected in the claims, the application aspect lies in the features are less than the features of the single embodiment disclosed above. Therefore, the claims conforming to the specific implementation manners are thus clearly incorporated into the specific implementation manners, where each claim itself serves as a single embodiment of the embodiments of the application.

Those skilled in the art can understand that the modules in the device in one embodiment can be adaptively changed and are arranged in one or more devices different from the devices in the embodiment. The modules, or units or components in the embodiment can be combined to form one module or unit or component, and besides can be separated to form multiple sub-modules or sub-units or sub-components. Except that at least some of such features and/or processes or units are mutually exclusionary, the features disclosed in the specification, and any method, or the processes or the units of the devices disclosed in this manner can be combined by adopting any combination. Unless otherwise definitely stated, each feature disclosed in the specification (including the appended claims, abstract and accompanying drawings) may be replaced by an alternative feature providing the same, equivalent or similar purpose.

Furthermore, those skilled in the art can understand that although some embodiments described herein include certain features included in other embodiments but not other features, and the combinations of the features of different embodiments are intended to be within the scope of the embodiments of the application and form different embodiments. For example, in the claims, any one of the claimed embodiments can be used in any combination.

The various component embodiments of the embodiments of the application may be realized by hardware, or by software modules operating on one or more processors, or by a combination of the hardware and software modules. Those skilled in the art should understand that a microprocessor or a digital signal processor (DSP) may be used in practice to realize some or all of the functions of some or all components in the method for controlling the jitter in the network communication according to the embodiments of the application. The embodiments of the application can also be realized in a form of a device or a device program (for example, a computer program and a computer program product) for performing part or all of the methods described herein. The program for realizing the embodiments of the application in this manner can be stored on a computer-readable medium, or has the form of one or more signals. Such signals can be downloaded from internet websites, or provided on carrier signals, or provided in any other form.

It should be noted that the above embodiments are used to illustrate the embodiments of the application, rather than limiting the embodiments of the application, and those skilled in the art can design alternative embodiments without departing from the scope of the appended claims. In the claims, any reference signs placed between brackets should not be constructed as a limitation on the claims. The word "include" does not exclude the presence of components or steps not listed in the claims. The word "one" or "a" preceding a component does not exclude the presence of multiple such components. The embodiments of the application can be realized by means of hardware including several different components and by means of a proper programming computer. In the unit claims listing several devices, several of these devices can be embodied by a same hardware item. The use of the words, such as first, second, and third, does not indicate any order. These words can be interpreted as names.

We claim:

1. A method for controlling a jitter in network communication, which is applied to a terminal, the method comprising:

generating trigger information, wherein the trigger information is for triggering switching of a jitter control strategy for the network communication, the jitter control strategy comprises a first control strategy based on a first cached data amount and a second control strategy based on a second cached data amount, the first cached data amount is an amount of data that needs to be cached when the first control strategy is used to control the jitter in the network communication, the second cached data amount is an amount of data that needs to be cached when the second control strategy is used to control the jitter in the network communication, and the first cached data amount is smaller than the second cached data amount;

switching the jitter control strategy to a target control strategy in response to the trigger information; and controlling the jitter in the network communication by using the target control strategy;

wherein the target control strategy is the first control strategy or the second control strategy which corresponds to the trigger information, wherein the trigger information comprises: first trigger information for switching the jitter control strategy from the first control strategy to the second control strategy, or second trigger information for switching the jitter control strategy from the second control strategy to the first control strategy;

wherein the method further comprises:

generating the first trigger information, when a background sound volume in the network communication changes from a value in a first range to a value in a second range, and a second application program is in a start state; or generating the second trigger information, when a background sound volume in the network communication changes from a value in a second range to a value in a first range, and a first application program is in a start state;

wherein a maximum value in the first range is smaller than a minimum value in the second range;

wherein the first application program is an application program for controlling the jitter by using the first control strategy on the terminal, and the second application program is an application program for controlling the jitter by using the second control strategy on the terminal.

2. The method according to claim 1, wherein said generating the trigger information comprises:

acquiring a switching request for generating the trigger information, wherein the switching request comprises a first switching request or a second switching request; generating the first trigger information when the switching request is the first switching request; or generating the second trigger information when the switching request is the second switching request.

3. The method according to claim 1, wherein said generating the trigger information comprises:
generating the first trigger information when the terminal closes the first application program and starts the second application program; or
generating the second trigger information when the terminal starts the first application program and closes the second application program.

4. The method according to claim 2, wherein when the trigger information is the first trigger information, said switching the jitter control strategy and controlling the jitter comprises:
switching the jitter control strategy to the second control strategy, for using the second cached data amount as a target cached data amount of the target control strategy; adding preset data packets into a cached data set in the network communication; and controlling the jitter in the network communication based on the target cached data amount, when the amount of data packets in the cached data set is within a cached data range corresponding to the target cached data amount.

5. The method according to claim 2, wherein when the trigger information is the second trigger information, said switching the jitter control strategy and controlling the jitter comprises:
switching the jitter control strategy to the first control strategy, for using the first cached data amount as a target cached data amount of the target control strategy; and reducing the amount of data packets in a cached data set in the network communication; and
controlling the jitter in the network communication by using an acceleration strategy and/or a deceleration strategy based on the target cached data amount when the amount of the data packets in the cached data set is within a cached data range corresponding to the target cached data amount;
wherein the acceleration strategy and the deceleration strategy are configured to keep the amount of the data packets in the cached data set in the network communication within the cached data range corresponding to the target cached data amount.

6. A terminal comprising:
a processor; and
a memory configured to store executable instructions of the processor;
wherein the processor is configured to:
generate trigger information, wherein the trigger information is for triggering switching of a jitter control strategy for network communication, the jitter control strategy comprises a first control strategy based on a first cached data amount and a second control strategy based on a second cached data amount, the first cached data amount is an amount of data that needs to be cached when the first control strategy is used to control jitter in the network communication, the second cached data amount is an amount of data that needs to be cached when the second control strategy is used to control the jitter in the network communication, and the first cached data amount is smaller than the second cached data amount;
switch the jitter control strategy to a target control strategy in response to the trigger information; and
control the jitter in the network communication by using the target control strategy;
wherein the target control strategy is the first control strategy or the second control strategy which corresponds to the trigger information;
wherein the trigger information comprises: first trigger information for switching the jitter control strategy from the first control strategy to the second control strategy, or second trigger information for switching the jitter control strategy from the second control strategy to the first control strategy;
wherein the processor is further configured to:
generate the first trigger information, when a background sound volume in the network communication changes from a value in a first range to a value in a second range, and a second application program is in a start state; or
generate the second trigger information, when a background sound volume in the network communication changes from a value in a second range to a value in a first range, and a first application program is in a start state;
wherein a maximum value in the first range is smaller than a minimum value in the second range;
wherein the first application program is an application program for controlling the jitter by using the first control strategy on the terminal, and the second application program is an application program for controlling the jitter by using the second control strategy on the terminal.

7. The terminal according to claim 6, wherein the processor is configured to:
acquire a switching request for generating the trigger information, wherein the switching request comprises a first switching request or a second switching request;
generate the first trigger information when the switching request is the first switching request; or
generate the second trigger information when the switching request is the second switching request.

8. The terminal according to claim 6, wherein the processor is configured to:
generate the first trigger information when the terminal closes the first application program and starts the second application program; or
generate the second trigger information when the terminal starts the first application program and closes the second application program.

9. The terminal according to claim 7, wherein when the trigger information is the first trigger information, the processor is configured to:
switch the jitter control strategy to the second control strategy, for using the second cached data amount as a target cached data amount of the target control strategy;
add preset data packets into a cached data set in the network communication; and
control the jitter in the network communication based on the target cached data amount, when the amount of data packets in the cached data set is within a cached data range corresponding to the target cached data amount.

10. The terminal according to claim 7, wherein when the trigger information is the second trigger information, the processor is configured to:
switch the jitter control strategy to the first control strategy, for using the first cached data amount as a target cached data amount of the target control strategy;
reduce the amount of data packets in a cached data set in the network communication; and
control the jitter in the network communication by using an acceleration strategy and/or a deceleration strategy based on the target cached data amount when the amount of the data packets in the cached data set is within the cached data range corresponding to the target cached data amount;

wherein the acceleration strategy and the deceleration strategy are configured to keep the amount of the data packets in the cached data set in the network communication within the cached data range corresponding to the target cached data amount.

11. A non-transitory computer-readable storage medium, wherein when instructions in the storage medium are performed by a processor of an electronic device, the electronic device is configured to:

generate trigger information, wherein the trigger information is for triggering switching of a jitter control strategy for network communication, the jitter control strategy comprises a first control strategy based on a first cached data amount and a second control strategy based on a second cached data amount, the first cached data amount is an amount of data that needs to be cached when the first control strategy is used to control jitter in the network communication, the second cached data amount is an amount of data that needs to be cached when the second control strategy is used to control the jitter in the network communication, and the first cached data amount is smaller than the second cached data amount;

switch the jitter control strategy to a target control strategy in response to the trigger information; and control the jitter in the network communication by using the target control strategy;

wherein the target control strategy is the first control strategy or the second control strategy which corresponds to the trigger information;

wherein the trigger information comprises: first trigger information for switching the jitter control strategy from the first control strategy to the second control strategy, or second trigger information for switching the jitter control strategy from the second control strategy to the first control strategy;

wherein the electronic device is configured to:

generate the first trigger information, when a background sound volume in the network communication changes from a value in a first range to a value in a second range, and a second application program is in a start state; or generate the second trigger information, when a background sound volume in the network communication changes from a value in a second range to a value in a first range, and a first application program is in a start state;

wherein a maximum value in the first range is smaller than a minimum value in the second range;

wherein the first application program is an application program for controlling the jitter by using the first control strategy on a terminal, and the second application program is an application program for controlling the jitter by using the second control strategy on the terminal.

* * * * *